(12) United States Patent
Komada et al.

(10) Patent No.: US 10,494,053 B2
(45) Date of Patent: Dec. 3, 2019

(54) OPERATING DEVICE

(71) Applicant: Shimano Inc., Sakai, Osaka (JP)

(72) Inventors: Yasuyuki Komada, Osaka (JP); Kohei Obuchi, Osaka (JP); Takuma Sakai, Osaka (JP)

(73) Assignee: Shimano Inc., Osaka (JP)

( * ) Notice: Subject to any disclaimer, the term of this patent is extended or adjusted under 35 U.S.C. 154(b) by 97 days.

(21) Appl. No.: 15/876,171

(22) Filed: Jan. 21, 2018

(65) Prior Publication Data
US 2019/0225299 A1    Jul. 25, 2019

(51) Int. Cl.
| | | |
|---|---|---|
| *B62L 3/02* | (2006.01) | |
| *B62K 23/06* | (2006.01) | |
| *F15B 7/08* | (2006.01) | |
| *F16B 7/18* | (2006.01) | |

(52) U.S. Cl.
CPC .............. *B62L 3/023* (2013.01); *B62K 23/06* (2013.01); *F15B 7/08* (2013.01); *F16B 7/18* (2013.01)

(58) Field of Classification Search
CPC ... F16B 7/04; B60T 7/102; B60T 7/10; Y10T 74/20396
See application file for complete search history.

(56) References Cited

U.S. PATENT DOCUMENTS

| | | | |
|---|---|---|---|
| 6,336,525 B1 | 1/2002 | Leng | |
| 7,308,791 B2 * | 12/2007 | Takizawa | B62L 3/023 |
| | | | 188/344 |
| 7,530,435 B2 | 5/2009 | Lumpkin | |
| 8,061,667 B2 * | 11/2011 | Weiss | B62K 23/06 |
| | | | 248/229.13 |
| 9,440,703 B2 * | 9/2016 | Miki | B62K 21/26 |
| 9,487,264 B2 * | 11/2016 | Abhold | B62K 23/06 |
| 9,550,544 B2 * | 1/2017 | Takeuchi | B62K 23/06 |
| 9,759,243 B2 * | 9/2017 | Hirotomi | B62K 23/06 |
| 10,300,983 B2 * | 5/2019 | Nakai | B62K 23/06 |
| 2002/0070084 A1 | 6/2002 | Chou | |
| 2015/0096403 A1 * | 4/2015 | Hirotomi | B62K 23/06 |
| | | | 74/491 |
| 2016/0257372 A1 * | 9/2016 | Nakai | B62L 3/023 |

FOREIGN PATENT DOCUMENTS

| | | |
|---|---|---|
| DE | 20 2014 000 348 U1 | 5/2014 |
| EP | 0 764 574 A1 | 3/1997 |
| EP | 1514757 B1 | 8/2008 |
| EP | 2338778 B1 | 1/2016 |
| FR | 581 837 A | 12/1924 |
| FR | 917 581 A | 10/1947 |

* cited by examiner

*Primary Examiner* — Thomas E Lazo
(74) *Attorney, Agent, or Firm* — Global IP Counselors, LLP (57) ABSTRACT

An operating device is basically provided with a base member, an operating member and a handlebar fixing structure. The base member includes a support abutment having a contact surface that is arranged to contact an outer surface of a handlebar while the operating device is in an installed state. The contact surface defines an abutment circle about an abutment axis. The operating member is movably coupled to the base member. The handlebar fixing structure is provided on the base member. The handlebar fixing structure has a fixing surface. The fixing surface defines a fixing circle about a fixing axis offset from the abutment axis.

18 Claims, 8 Drawing Sheets

FIG. 13

OPERATING DEVICE

BACKGROUND

Field of the Invention

This invention generally relates to an operating device for a small vehicle including a handlebar for steering. More specifically, the present invention relates to an operating device that is attached to a handlebar.

Background Information

Recently, a straddle-type vehicle or a handlebar steered vehicle has a handlebar for steering the straddle-type vehicle. One example of a straddle-type vehicle or a handlebar steered vehicle is a bicycle. Often, the handlebar is provided with one or more operating devices for controlling the operation of the vehicle. In the case of a bicycle, the handlebar is often provided one or more brake operating devices for operating one or more braking devices, and one or more shift operating devices for operating one or more gear changing devices. Recently, the braking devices are hydraulically operated by the brake operating devices. In a hydraulic operating system for a bicycle, a hydraulic operating (actuating) device is fluidly connected to a hydraulic operated device by a hydraulic hose. The hydraulic operated device is hydraulically controlled by hydraulic fluid flowing through the hydraulic hose in response to an operation of the hydraulic operating device. For example, in the case of a hydraulic brake system, a brake caliper (i.e., the hydraulic operated device) is hydraulically controlled by hydraulic fluid flowing through the hydraulic hose in response to an operation of a brake lever of the hydraulic operating device. In particular, the operation of the brake lever forces hydraulic fluid through the hydraulic hose to the brake caliper. The hydraulic fluid then moves one of more pistons to cause the brake pads to squeeze a brake rotor that is attached to a hub of a bicycle wheel.

SUMMARY

Generally, the present disclosure is directed to various features of an operating device for a small vehicle including a handlebar for steering. Small vehicles as used herein refers to electric and non-electric vehicles regardless of the number of their wheels, but does not include four wheeled vehicles having an internal combustion engine as a power source for driving the wheels, or four wheeled electric vehicles that require a license to operate on public roads. A straddle-type vehicle as used herein refers to electric and non-electric vehicles having a seat or saddle that a rider straddles with one leg on one side of the vehicle and the other leg on the other side of the vehicle.

In one feature, an operating device is provided in which the operating device is stably mounted on a handlebar.

In view of the state of the known technology and in accordance with a first aspect of the present disclosure, an operating device is provided that basically comprises a base member, an operating member and a handlebar fixing structure. The base member includes a support abutment having a contact surface that is arranged to contact an outer surface of a handlebar while the operating device is in an installed state. The contact surface defines an abutment circle about an abutment axis. The operating member is movably coupled to the base member. The handlebar fixing structure is provided on the base member. The handlebar fixing structure has a fixing surface. The fixing surface defines a fixing circle about a fixing axis offset from the abutment axis.

With the operating device according to the first aspect, it is possible to easily stabilize the base member with respect to a handlebar.

In accordance with a second aspect of the present invention, the operating device according to the first aspect is configured so that the fixing circle has a fixing diameter, and the abutment circle has an abutment diameter that is larger than the fixing circle.

With the operating device according to the second aspect, it is possible to provide ensure good contact between the support abutment and the outer surface of the handlebar.

In accordance with a third aspect of the present invention, an operating device is provided that basically comprises a base member, an operating member and a handlebar fixing structure. The base member includes a support abutment having a contact surface that is arranged to contact an outer surface of a handlebar while the operating device is in an installed state. The contact surface defines an abutment circle about an abutment axis. The abutment circle has an abutment diameter. The operating member is movably coupled to the base member. The handlebar fixing structure is provided on the base member. The handlebar fixing structure has a fixing surface. The fixing surface defines a fixing circle about a fixing axis. The fixing circle has a fixing diameter. The abutment diameter is larger than the fixing diameter.

With the operating device according to the third aspect, it is possible to easily stabilize the base member with respect to a handlebar.

In accordance with a fourth aspect of the present invention, the operating device according to the second or third aspect is configured so that a ratio of the abutment diameter with respect to the fixing diameter is in a range from 1.02 to 1.10.

With the operating device according to the fourth aspect, it is possible to ensure good contact between the support abutment and the outer surface of the handlebar.

In accordance with a fifth aspect of the present invention, the operating device according to any one of the second to fourth aspects is configured so that the fixing diameter is in a range from 15 millimeters to 35 millimeters.

With the operating device according to the fifth aspect, it is possible to accommodate most common handlebar sizes.

In accordance with a sixth aspect of the present invention, the operating device according to any one of the first to fifth aspects is configured so that the fixing axis is offset from the abutment axis in a range from 0.5 millimeters to 1.5 millimeters.

With the operating device according to the sixth aspect, it is possible to accommodate most common handlebar sizes.

In accordance with a seventh aspect of the present invention, the operating device according to any one of the first to sixth aspects is configured so that the abutment axis is farther from the base member than the fixing axis.

With the operating device according to the seventh aspect, it is possible to ensure good contact between the support abutment and the outer surface of the handlebar to support the base member on the handlebar.

In accordance with an eighth aspect of the present invention, the operating device according to any one of the first to seventh aspects is configured so that the handlebar fixing structure further includes a fixing portion, a first clamp part, a second clamp part and a fixing fastener. The fixing portion is provided on the base member and has the fixing surface. The first clamp part is coupled to the fixing portion. The second clamp part is hingedly connected to the first clamp part. The fixing fastener is coupled to one of the fixing portion and the first clamp part so as to fasten at least the second clamp part to the fixing portion.

With the operating device according to the eighth aspect, it is possible to easily attach the operating device to the handlebar.

In accordance with a ninth aspect of the present invention, the operating device according to the eighth aspect is configured so that the handlebar fixing structure further includes a ring member provided on the fixing fastener and arranged between the fixing portion and the second clamp part.

With the operating device according to the ninth aspect, it is possible to prevent the handlebar fixing structure from the fixing fastener from falling out prior to installation.

In accordance with a tenth aspect of the present invention, the operating device according to the eighth or ninth aspect is configured so that the first clamp part is hingedly connected to the fixing portion.

With the operating device according to the tenth aspect, it is possible to possible to easily attach the hydraulic operating device around a handlebar.

In accordance with an eleventh aspect of the present invention, the operating device according to any one of the eighth to tenth aspects is configured so that the first clamp part has a first contact point and a second clamp part has a second contact point. The first and second clamping points are arranged to apply a pushing force to the handlebar towards the fixing surface of the fixing portion.

With the operating device according to the eleventh aspect, it is possible to securely attach the operating device to the handlebar.

In accordance with a twelfth aspect of the present invention, the operating device according to any one of the eight to eleventh aspects is configured so that the fixing fastener is threadedly coupled to the fixing portion.

With the operating device according to the twelfth aspect, it is possible to easily tighten the handlebar fixing structure around the handlebar.

In accordance with a thirteenth aspect of the present invention, the operating device according to the twelfth aspect is configured so that the operating member includes a left-hand operated lever; and the fixing fastener includes a left-hand threaded bolt.

With the operating device according to the thirteenth aspect, it is possible a left-hand operating device to counteract the tightening torque of the fixing fastener that is applied to the base member during tightening by having the support abutment contact and support the base member on the handlebar.

In accordance with a fourteenth aspect of the present invention, the operating device according to the twelfth aspect is configured so that the operating member is a left-hand operated lever; and the fixing fastener is a right-hand threaded bolt that is arranged to provide a tightening direction that rotates towards the handlebar on a side with the support abutment.

With the operating device according to the fourteenth aspect, it is possible in a a left-hand operating device to counteract the tightening torque of the fixing fastener that is applied to the base member during tightening by having the support abutment contact and support the base member on the handlebar.

In accordance with a fifteenth aspect of the present invention, the operating device according to any one of the first to fourteenth aspects is configured so that the base member includes a cylinder housing having a cylinder bore and having a piston movably disposed in the cylinder bore, and the operating member is operatively coupled to the piston to move the piston within the cylinder bore.

With the operating device according to the fifteenth aspect, it is possible to use the operating device to operate a hydraulically operated device such as a disc brake caliper.

In accordance with a sixteenth aspect of the present invention, the operating device according to the fifteenth aspect is configured so that the operating member is pivotally mounted on the base member about a pivot axis, and the cylinder bore extends along a cylinder axis that is not perpendicular to the fixing axis as viewed in a pivot axis direction of the pivot axis.

With the operating device according to the sixteenth aspect, it is possible to compactly arrange the cylinder housing and still easily operate the operating member.

In accordance with a seventeenth aspect of the present invention, the operating device according to the fifteenth or sixteenth aspect is configured so that the operating member is pivotally mounted on the base member about a pivot axis, and the cylinder bore extends along a cylinder axis that is not parallel to a handlebar axis of the fixing axis as viewed in a pivot axis direction of the pivot axis.

With the operating device according to the seventeenth aspect, it is possible to compactly arrange the cylinder housing and still easily operate the operating member.

In accordance with an eighteenth aspect of the present invention, the operating device according to any one of the fifteenth to seventeenth aspects is configured so that the operating member is pivotally mounted on the base member about a pivot axis, and the base member includes a hydraulic reservoir tank in fluid communication with the cylinder bore. The hydraulic reservoir tank extends along a reservoir axis that is not perpendicular to the fixing axis as viewed in a pivot axis direction of the pivot axis.

With the operating device according to the eighteenth aspect, it is possible to provide a hydraulic reservoir tank while maintaining a relatively compact profile with respect to the handlebar fixing structure.

In accordance with a nineteenth aspect of the present invention, the operating device according to any one of the fifteenth to seventeenth aspects is configured so that the operating member is pivotally mounted on the base member about a pivot axis, and the base member includes a hydraulic reservoir tank in fluid communication with the cylinder bore. The hydraulic reservoir tank extends along a reservoir axis that is not parallel to the fixing axis as viewed in a pivot axis direction of the pivot axis.

With the operating device according to the nineteenth aspect, it is possible to provide a hydraulic reservoir tank while maintaining a relatively compact profile with respect to the handlebar fixing structure.

Also, other objects, features, aspects and advantages of the disclosed hydraulic operating device will become apparent to those skilled in the art from the following detailed description, which, taken in conjunction with the annexed drawings, discloses one embodiment of the hydraulic operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the small vehicle field, in particular the bicycle field from this disclosure that the following descriptions of the embodiments are provided for illustration only and not for the purpose of limiting the invention as defined by the appended claims and their equivalents.

Figure 1:
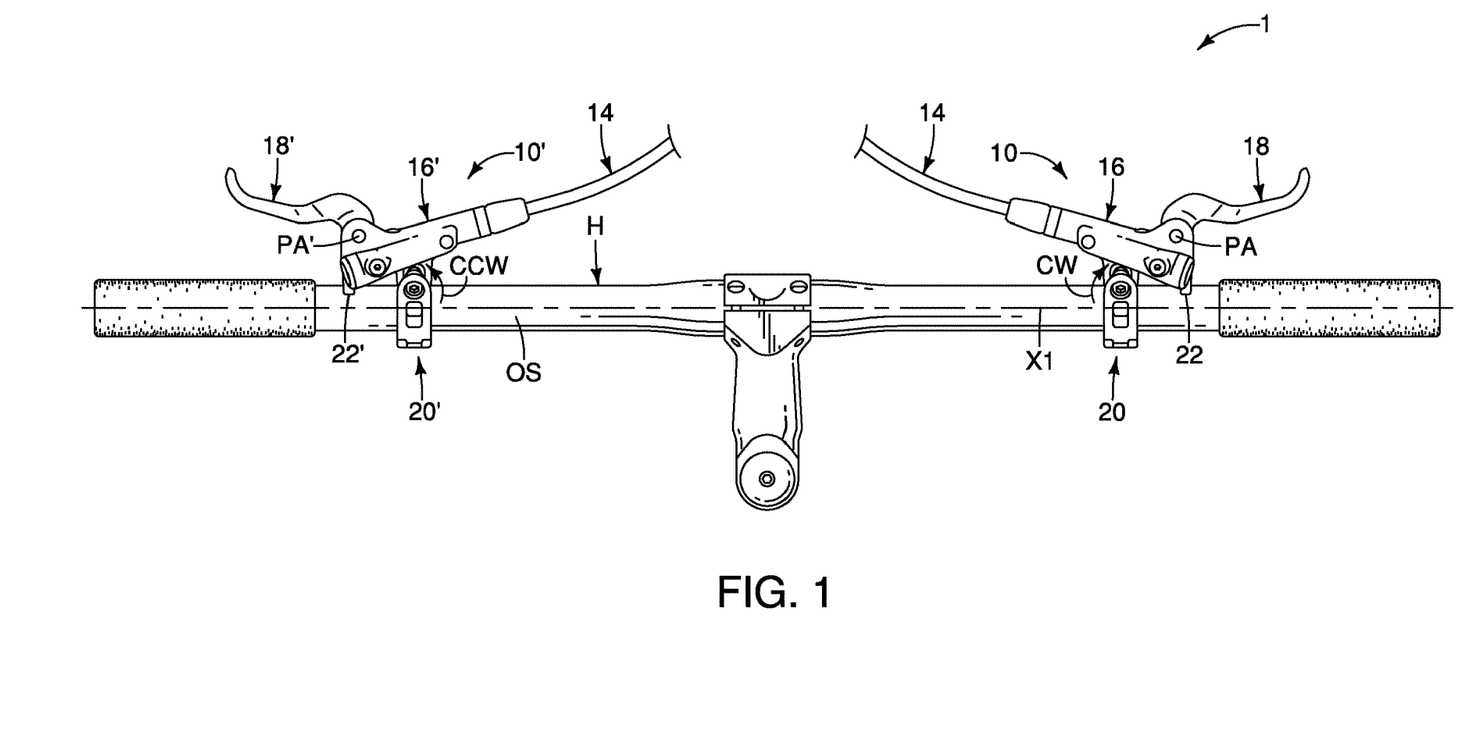
FIG. 1 is a top plan view of a bicycle handlebar equipped with a pair of operating devices (i.e. a brake operating system) in accordance with one illustrated embodiment.

Referring initially to FIG. 1, a brake operating system 1 is illustrated in accordance with one illustrative embodiment. The brake operating system 1 includes a right-hand operating device 10 and a left-hand operating device 10'. Here, the operating devices 10 and 10' are bicycle hydraulic operating devices. In more detail, the operating devices 10 and 10' are bicycle hydraulic brake operating devices. The operating devices 10 and 10' are installed on a bicycle of which only a handlebar H is shown. Bicycles having this kind of handlebars are recognized as handlebar steered vehicles. The operating device 10 and 10' is mounted on the right-hand side of the handlebar H, while the operating device 10' is mounted on the left-hand side of the handlebar H. Each of the operating devices 10 and 10' is fluidly connected to a hydraulic operated device (not shown) by a hydraulic hose 14. For example, the operating device 10 is operated by the rider's right-hand to actuate a hydraulic operated device such as a disc brake caliper, while the operating device 10 is operated by the rider's left-hand to actuate a hydraulic operated device such as a disc brake caliper. It will be apparent to those skilled in the bicycle field that the operating devices 10 and 10' can be used with other bicycle components other than a disc brake caliper.

Referring to FIG. 1, the operating device 10 comprises a base member 16, an operating member 18 and a handlebar fixing structure 20. Similar, the operating device 10' comprises a base member 16', an operating member 18' and a handlebar fixing structure 20'. The operating devices 10 and 10' are mirror images of each other except for the modifications explained below. In view of the similarities between the operating devices 10 and 10', the drawings and the following description will primarily focus on the operating device 10. Thus, only the differences of the operating device 10' from the operating device 10 will be discussed and/or illustrated.

Figure 9:
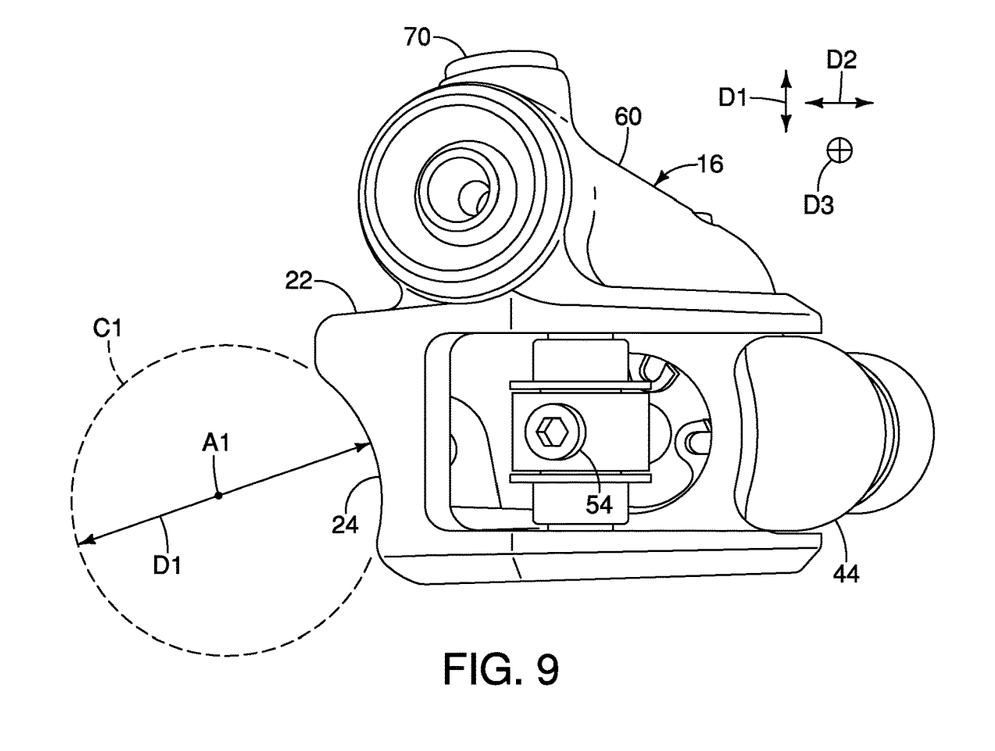
FIG. 9 is an enlarged outside end elevational view of the operating device illustrated in FIGS. 2 to 7 but with the operating member (e.g., a brake lever) and the assembly removed.

Referring to FIGS. 2 to 4 and 9, the base member 16 includes a support abutment 22 having a contact surface 24 that is arranged to contact an outer surface OS of the handlebar H while the operating device 10 is in an installed state. The contact surface 24 defines an abutment circle C1 about an abutment axis A1 as seen in FIG. 9. The abutment circle C1 has an abutment diameter D1. The support abutment 22 is spaced from the handlebar fixing structure 20 in a direction parallel to a handlebar axis X1 by an axial width W1 with a range from ten millimeters to thirty millimeters. More preferably, the axial width W1 between the handlebar fixing structure 20 and the support abutment 22 is twenty millimeters plus or minus one millimeter. The support abutment 22 has an axial width W2 with a range from three millimeters to eight millimeters as measured in a direction parallel to the handlebar axis X1. More preferably, the axial width W2 of the support abutment 22 is five millimeters plus or minus one millimeter. The handlebar axis X1 extends longitudinally along the handlebar H between opposite ends of the handlebar H.

Figure 2:
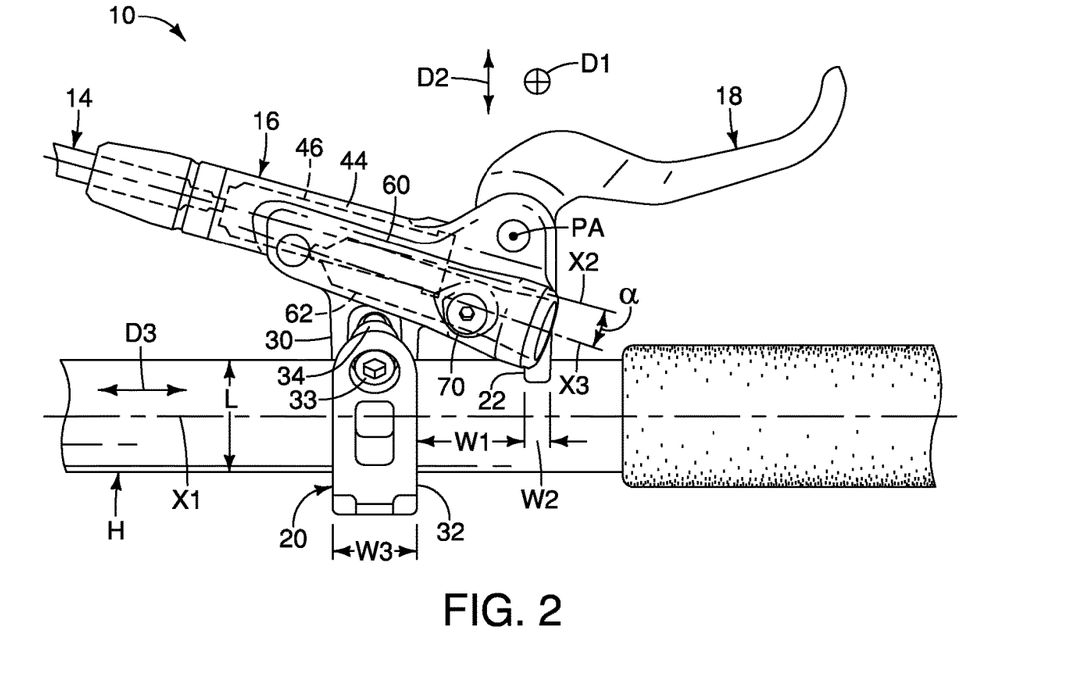
FIG. 2 is a top plan view of a portion of the bicycle handlebar and one of the operating devices illustrated in FIG. 1.
Figure 3:
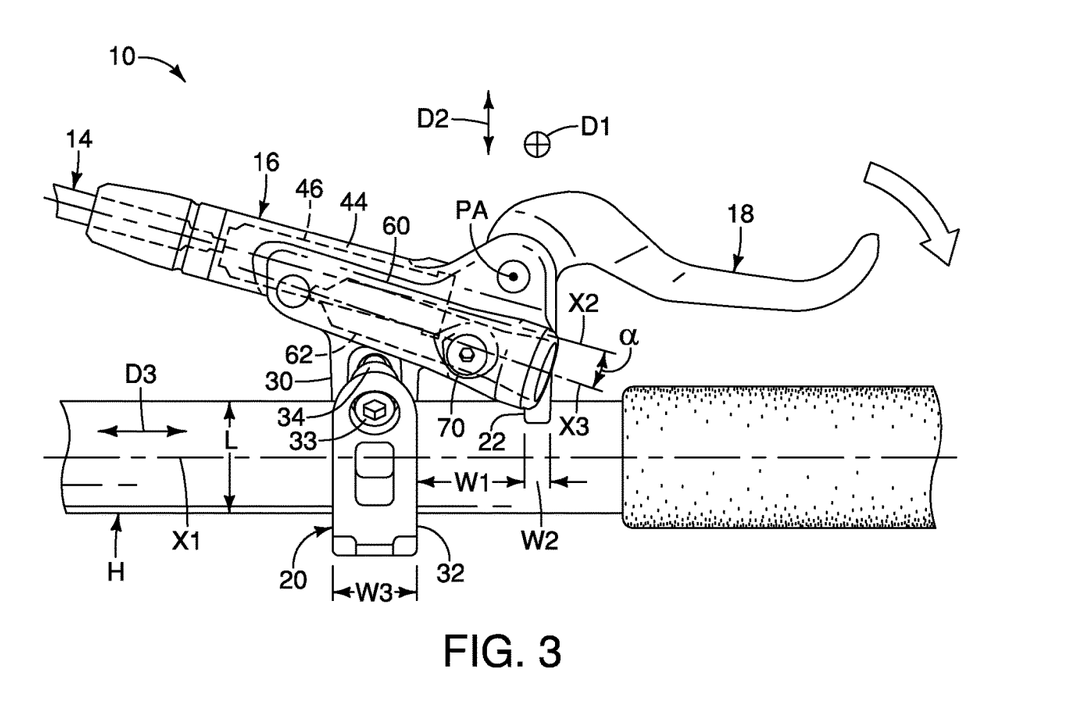
FIG. 3 is a top plan view of the portion of the bicycle handlebar and the operating device illustrated in FIG. 2, but with an operating member (e.g., a brake lever) moved to an operated position.

In the illustrated embodiment, the operating device 10 is mounted to the handlebar (bicycle handlebar) H by the handlebar fixing structure 20. The operating member 18 is movably coupled to the base member 16. As seen in FIGS. 2 and 3, in the illustrated embodiment, the operating member 18 is pivotally mounted on the base member 16 about a pivot axis PA. Preferably, the operating member 18 includes a lever 26. Here, the lever 26 is pivotally mounted relative to the base member 16 by a pivot pin 28 from a rest (non-operated) position (FIGS. 1 and 2) to an operated position (FIG. 3). The handlebar fixing structure 20 is provided on the base member 16. The handlebar fixing structure 20 is coupled to the base member 16 as explained below.

In the illustrated embodiment, as seen in FIGS. 2 to 7, the handlebar fixing structure 20 includes a fixing portion 30, a first clamp part 31, a second clamp part 32 and a fixing fastener 33. Optionally, the handlebar fixing structure 20 further includes a ring member 34 that is provided on the fixing fastener 33. The ring member 34 is arranged between the fixing portion 30 and the second clamp part 32. The ring member 34 is preferably made of a compressible material such that the ring member 34 can be easily installed and retained on the fixing fastener 33 prior to installation. More preferably, the ring member 34 is an elastomeric O-ring made of a resilient material.

In the illustrated embodiment, the fixing portion 30 is provided on the base member 16. More preferably, in the illustrated embodiment, the fixing portion 30 is integrally formed with the base member 16 as a one-piece member.

The first clamp part 31 is coupled to the fixing portion 30. In the illustrated embodiment, the first clamp part 31 is hingedly connected to the fixing portion 30. The second clamp part 32 is hingedly connected to the first clamp part 31. Thus, the first clamp part 31 has a first end hingedly connected to the base member 16 by a pivot pin 36, and a second end hingedly connected the second clamp part 32 by a pivot pin 38. The second clamp part 32 has a first end with an opening 32a for receiving the fixing fastener 33, and a second end hingedly connected the first clamp part 31 by the pivot pin 38. The fixing fastener 33 is coupled to one of the fixing portion 30 and the first clamp part 31 so as to fasten at least the second clamp part 32 to the fixing portion 30.

Figure 7:
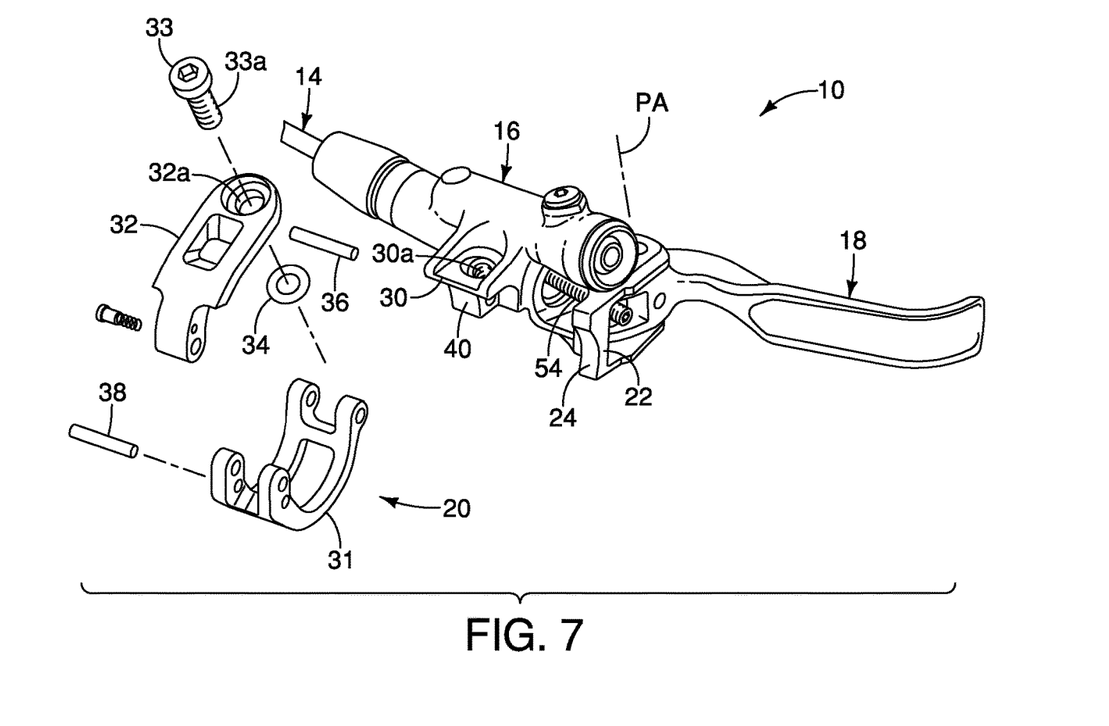
FIG. 7 is a partial exploded perspective view of the operating device illustrated in FIGS. 2 to 6.

Here, in the illustrated embodiment, as seen in FIG. 7, the fixing fastener 33 is threadedly coupled to the fixing portion 30. More specifically, the fixing portion 30 has a threaded hole 30a and the fixing fastener 33 is a fixing bolt with a threaded shaft 33a. The threaded shaft 33a of the fixing fastener 33 is threaded into the threaded hole 30a of the fixing portion 30 to tighten the first and second clamp parts 31 and 32 around the handlebar H. The threads of the threaded hole 30a and the threaded shaft 33a are right-hand threads such that the fixing fastener 33 is rotated in a clockwise direction CW to tighten the first and second clamp parts 31 and 32 together with respect to the fixing portion 30. Thus, the fixing fastener 33 is a right-hand threaded bolt that is arranged to provide a tightening direction that rotates towards the handlebar on a side with the support abutment 22. In this way, the torque applied to the base member 16 during tightening of the fixing fastener 33 is counteracted by the support abutment 22 contacting the outer surface OS of the handlebar H.

In the case of the operating device 10', the operating member 18' includes a left-hand operated lever. The operating member 18' is pivotally mounted on the base member 16' about a pivot axis PA'. The base member 16' includes a support abutment 22' having a contact surface that is arranged to contact the outer surface OS of the handlebar H while the operating device 10' is in an installed state. Thus, in the illustrated embodiment as seen in FIG. 1, the handlebar fixing structure 20' is identical to the handlebar fixing structure 20, except that the right-hand threaded bolt of the fixing fastener 33 is replaced with a fixing fastener 33' (FIG. 1) that includes a left-hand threaded bolt. Thus, the threaded hole (not shown) of the base member 16' has a left-hand thread instead of a right-hand thread for threadedly receiving the fixing fastener 33'. As a result, the fixing fastener 33' is rotated in a clockwise direction CCW to tighten the handlebar fixing structure 20' about the handlebar H. In this way, the torque applied to the base member 16' during tightening of the fixing fastener 33' is counteracted by the support abutment 22' contacting the outer surface OS of the handlebar H.

Figure 5:
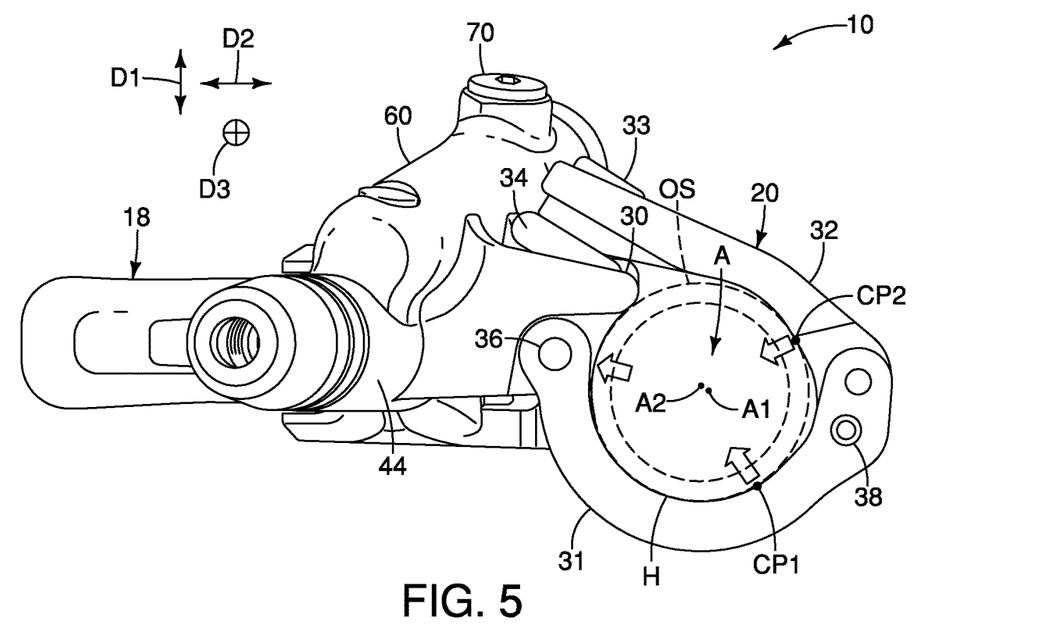
FIG. 5 is an enlarged inside end elevational view of the operating device illustrated in FIGS. 2 to 4 in which the handlebar shown in broken lines.

As seen in FIG. 5, the first clamp part 31 has a first contact point CP1 and a second clamp part 32 has a second contact point CP2. The first and second clamping points CP1 and CP2 are arranged to apply a pushing force to the handlebar H towards the fixing surface 40 of the fixing portion 30. Specifically, by tightening the fixing fastener 33, the first end of the second clamp part 32 is moved towards the fixing portion 30 while the first end of the first clamp part 31 pivot with respect to the fixing portion 30 to tighten the first and second clamp parts 31 and 32 around the handlebar H. In this way, the handlebar H is securely fastened between the fixing portion 30 and the first and second clamp parts 31 and 32. One of the first and second clamp parts 31 and 32 can be one piece unitary member with respect to the base member 16.

The handlebar fixing structure 20 defines a handlebar receiving area A. The handlebar receiving area A has a width dimension corresponding to a width dimension W3 of the handlebar fixing structure 20 in the axial direction of the handlebar axis X1 and a length dimension L corresponding to the diameter of the handlebar H at the handlebar fixing structure 20. The width dimension W3 of the handlebar fixing structure 20 in a range from ten millimeters to twenty-five millimeters as measured in a direction parallel to the handlebar axis X1. More preferably, the axial width W3 of the handlebar fixing structure 20 is sixteen millimeters plus or minus one millimeter.

Figure 8:
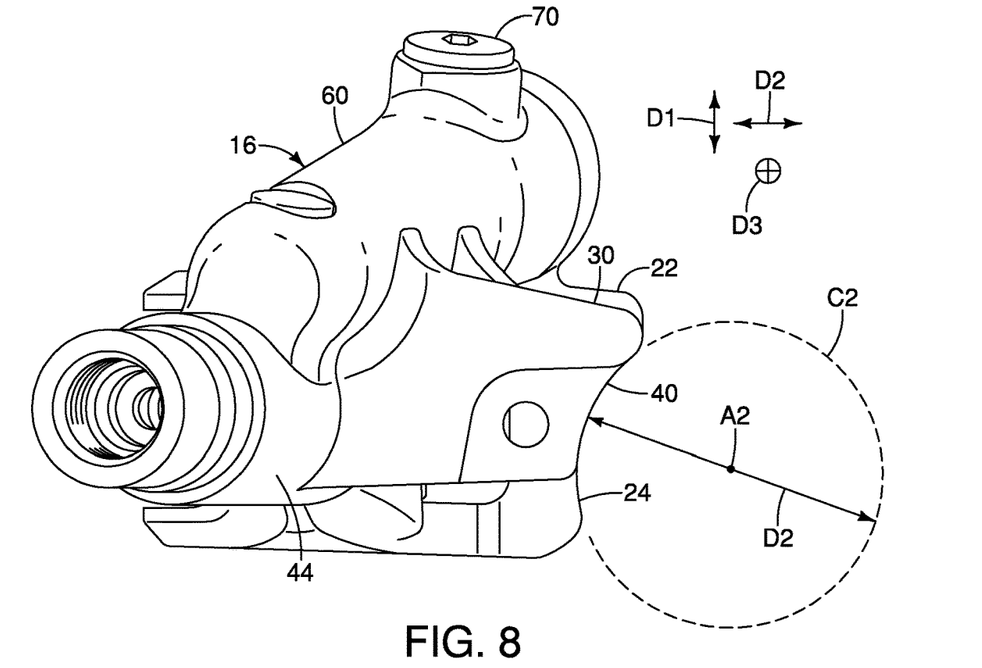
FIG. 8 is an enlarged inside end elevational view of the operating device illustrated in FIGS. 2 to 7 but with the operating member (e.g., a brake lever) and the assembly removed.

As seen in FIGS. 5 and 8, the handlebar fixing structure 20 has a fixing surface 40 In particular, the fixing portion 30 has the fixing surface. The fixing surface 40 defines a fixing circle C2 about a fixing axis A2 as seen in FIG. 8. The fixing circle C2 has a fixing diameter D2. The abutment diameter D1 is larger than the fixing diameter D2. Preferably, the fixing diameter D2 is in a range from 15 millimeters to 35 millimeters. A ratio of the abutment diameter D1 with respect to the fixing diameter D2 is in a range from 1.02 to 1.10. In the illustrated embodiment, the fixing axis A2 is offset from the abutment axis A1. The abutment axis A1 is farther from the base member 16 than the fixing axis A2. Preferably, the fixing axis A2 is offset from the abutment axis A1 in a range from 0.5 millimeters to 1.5 millimeters. More preferably, the fixing axis A2 is offset from the abutment axis A1 by one millimeter. However, the fixing axis F2 can be coaxial with the abutment axis A1 with the abutment diameter D1 being larger than the fixing diameter D2.

Figure 10:
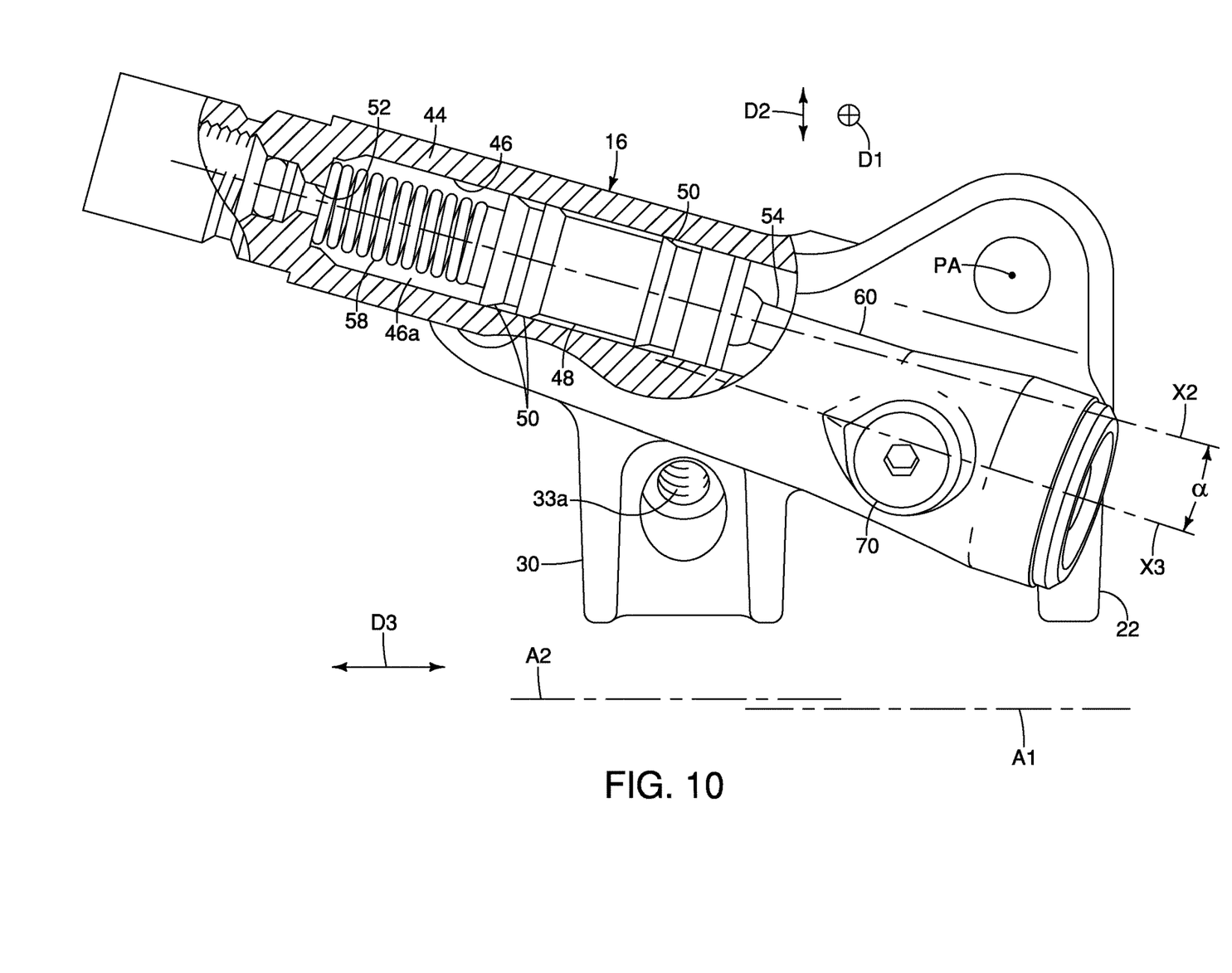
FIG. 10 is a top plan view of the base member of the operating device illustrated in FIGS. 2 to 7 with a portion broken way to reveal the piston in the cylinder.

As seen in FIG. 10, the base member 16 includes a cylinder housing 44 having a cylinder bore 46. The cylinder bore 46 has a piston 48 movably disposed in the cylinder bore 46. The operating member 18 is operatively coupled to the piston 48 to move the piston 48 within the cylinder bore 46. The piston 48 preferably includes a three sealing rings 50 that are in sliding contact with the cylinder bore 46. The sealing rings 50 are spaced apart on piston 48 along the cylinder axis X2 of the cylinder bore 46. The sealing rings 50 are preferably elastomeric (e.g., rubber) O-rings that each have a uniform cross-sectional profile.

The cylinder bore 46 of the cylinder housing 44 and the piston 48 define a hydraulic pressure chamber 46a in a space between the piston 48 and a fluid outlet port 52 of the cylinder housing 44. The pivot axis PA of the operating member 18 is arranged such that the operating member 18 pushes the piston 48 within the cylinder bore 46 from a non-actuated position (FIG. 2) to an actuated position (FIG. 3) as the operating member 18 is actuated about the pivot axis PA.

The piston 48 is movably disposed in the cylinder bore 46 and operatively coupled to the operating member 18 to move the piston 48 within the cylinder bore 46. The cylinder bore 46 defines a cylinder axis X2. Thus, the piston 48 moves linearly along the cylinder axis X2. In other words, here, the cylinder axis X2 is the center cylinder axis that extends in the direction of movement of the piston 48 inside of the cylinder bore 46. As seen in FIGS. 1 to 4, the cylinder bore 46 extends along the cylinder axis X2. The cylinder axis X2 is not perpendicular to the fixing axis A2 as viewed in a pivot axis direction D1 (indicated by the symbol "⊗" in FIGS. 1, 2, 4 and 5) of the pivot axis PA. The pivot axis direction D1 is parallel to the pivot axis PA of the operating member 18. Also, as seen in FIGS. 1 to 4, the cylinder axis X2 is not parallel to a handlebar axis X1 of the fixing axis A2 as viewed in a pivot axis direction D1 of the pivot axis PA. The cylinder axis X2 diverges from the handlebar axis X1 of the handlebar arrangement area A in an actuation direction of the piston 48 (i.e., a left side direction in the illustrated embodiment).

The operating member 18 further includes a push or connecting rod 54 that operatively connects the lever 26 to the piston 48. In this way, for example, the operating member 18 is coupled to the piston 48 to move the piston 48 within the cylinder bore 46. As seen in FIG. 10, the piston 48 at least partly overlaps the bicycle handlebar fixing structure 20 as viewed in a first perpendicular direction D2 that is perpendicular to the pivot axis PA of the operating member 18. In the illustrated embodiment the first perpendicular direction D2 is perpendicular to both the pivot axis PA and the handlebar axis X1.

Figure 6:
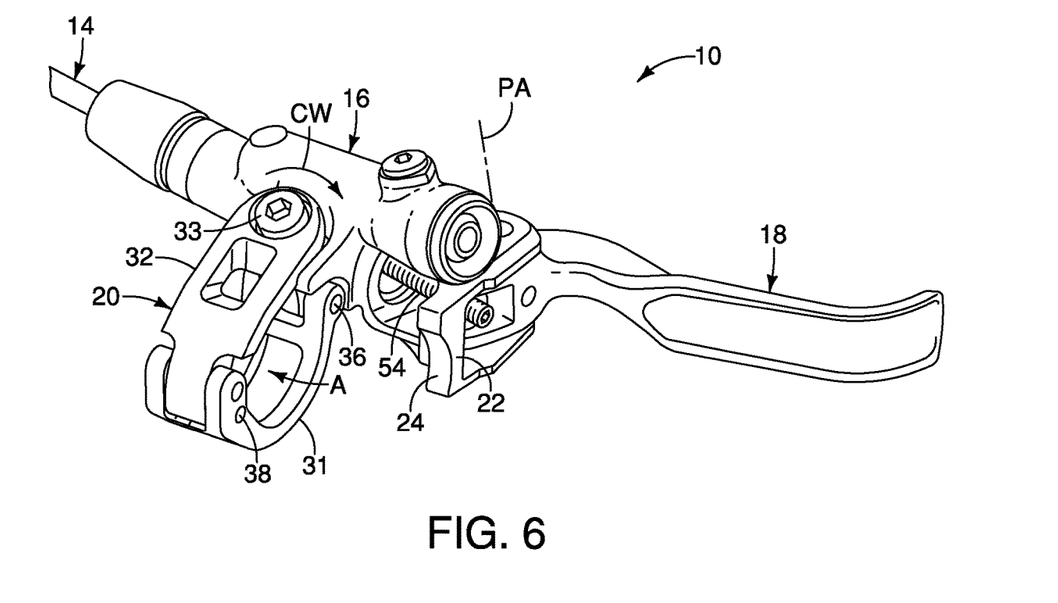
FIG. 6 is a perspective view of the operating device illustrated in FIGS. 2 to 4.

As seen in FIG. 10, the operating device 10 further comprises a biasing element 58 that is disposed in the cylinder bore 46, and biases the piston 48 to a non-actuated position. Here, the biasing element 58 is a coil compression spring that biases the piston 48 to the non-actuated (rest or non-operated) position. The biasing element 58 also biases the operating member 18 to its rest position (i.e., no external force applied to the lever 26 of the operating member 18 as seen in FIGS. 2 and 6. Thus, the piston 48 compresses the biasing element 58 as the piston 48 moves in the cylinder bore 46 in response to an operation of the lever 26 of the operating member 18.

Figure 4:
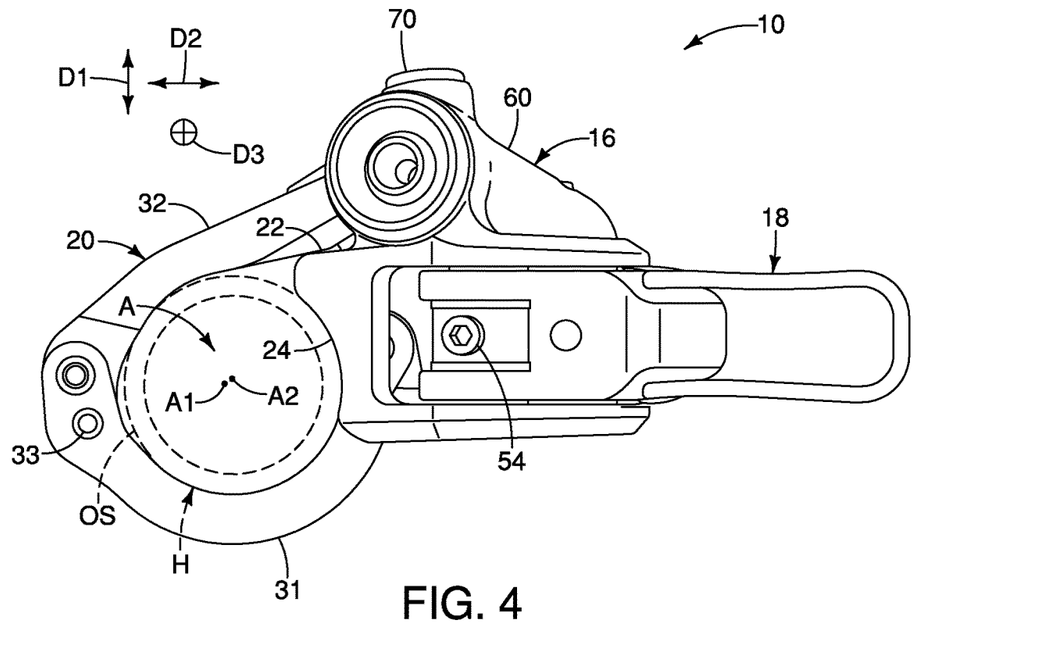
FIG. 4 is an enlarged outside end elevational view of the operating device illustrated in FIGS. 2 and 3 in which the handlebar shown in broken lines.

Also, in the illustrated embodiment, the base member 16 includes a hydraulic reservoir tank 60 in fluid communication with the cylinder bore 46. The hydraulic reservoir tank 60, the support abutment 22, the fixing portion 30, the cylinder housing 44 are all intergatlly form as a one-piece member from a suitable material such as a metal material. The hydraulic reservoir tank 60 extends along the cylinder bore 46. As seen in FIGS. 4 and 5, the hydraulic reservoir tank 60 is offset with respect to the handlebar arrangement area A as view in a second perpendicular direction D3 (indicated by the symbol "⊗" in FIGS. 4, 5, 8 and 9) that is perpendicular to the pivot axis PA of the operating member 18. In the illustrated embodiment, the second perpendicular direction D3 is perpendicular to the pivot axis PA and is parallel to the handlebar axis X1. As seen in FIGS. 2 and 3, the hydraulic reservoir tank 60 at least partially overlaps the handlebar arrangement area A as viewed in the pivot axis direction D1 that is parallel to the pivot axis PA of the operating member 18.

In the illustrated embodiment, the hydraulic reservoir tank 60 extends along a reservoir axis X3. The reservoir axis X3 is a center longitudinal axis of a hydraulic fluid chamber 62 defined by the hydraulic reservoir tank 60. The hydraulic reservoir tank 60 at least partially overlaps the cylinder bore 46 as view in the pivot axis direction D1 that is parallel to the pivot axis PA of the operating member 18. As seen in FIG. 1, the reservoir axis X3 is angled with respect to the cylinder axis X2 with a range from 3 degrees to 25 degrees as viewed in the pivot axis direction D1. In other words, an angle a between the cylinder axis X2 and the reservoir axis X3 is set with a range from 3 degrees to 25 degrees as viewed in the pivot axis direction D1. In the illustrated embodiment, the angle α is approximately 5 degrees. Moreover, as seen in FIGS. 2 and 3, the reservoir axis X3 is not perpendicular to the fixing axis A2 as viewed in a pivot axis direction D1 of the pivot axis PA. Also, the reservoir axis X3 that is not parallel to the fixing axis A2 as viewed in a pivot axis direction D1 of the pivot axis PA.

As seen in FIGS. 2 and 3, the base member 16 further comprises a bleed valve 70 that is fluidly connected to the hydraulic fluid chamber 62 of the hydraulic reservoir tank 60. Here, the bleed valve 70 is disposed on the side of the handlebar fixing structure 20 that has the support abutment 22.

Figure 11:
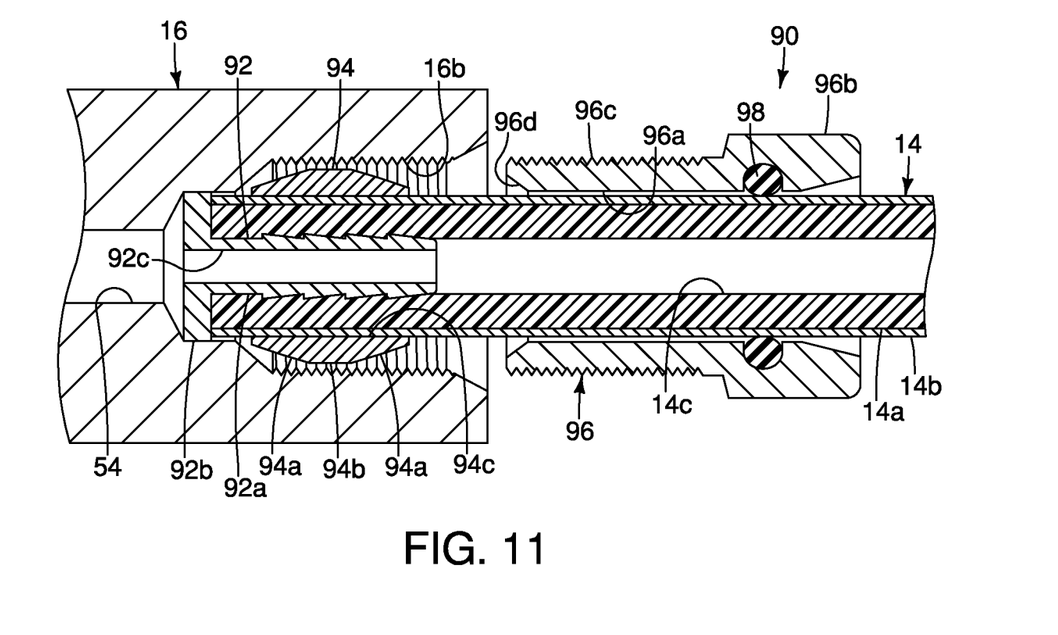
FIG. 11 is a partial cross-sectional view of a portion of the base member of the operating device illustrated in FIGS. 2 to 7 showing an end portion of a hydraulic hose about to be coupled to the base member.
Figure 12:
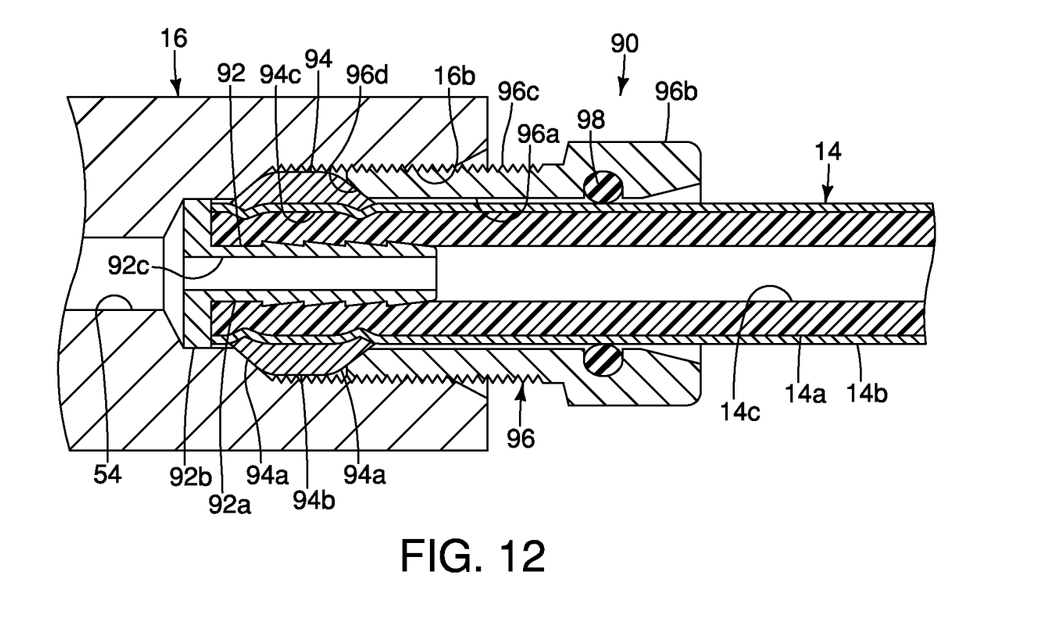
FIG. 12 is a partial cross-sectional view of the portion of the base member of the operating device illustrated in FIG. 11 showing the end portion of the hydraulic hose coupled to the base member.

Referring now to FIGS. 11 and 12, a hydraulic hose fitting 90 will now be discussed for connecting the hydraulic hose 14 to the base member 16. The connection structure 90 basically includes a rigid tubular insert 92, a tubular bushing 94 and a connecting fastener 96. Here, the connecting fastener 96 is provided with a hose retaining member 98 in the form of an elastomeric O-ring to aid in retaining the connecting fastener 96 on the hydraulic hose 14. The hydraulic hose 14 is also a conventional component that is preferably constructed of a flexible rubber tube 14a having a metallic braided sheath 14b. Since the hydraulic hose 14 is relatively conventional, the hydraulic hose 14 will not be discussed or illustrated in detail herein.

The tubular insert 92 has a tubular section 92a and an annular flange section 92b. A longitudinal passageway 92c passes through the tubular section 92a and the flange section 92b. The outer surface of the tubular portion 92a has a plurality of inclined barbs such that the tubular section 92a is securely retained in an interior passage 14c of the hydraulic hose 14. The tubular insert 92 is designed to be retained in the ends of the hydraulic hose 14 to provide radial support at the ends of the hydraulic hose 14. Accordingly, the tubular insert 92 is constructed of a rigid material such as a metallic material. For example, the tubular insert 92 can be formed of a copper or a copper alloy.

The tubular bushing 94 is preferably constructed of a relatively deformable metallic material such as copper or a copper alloy. The tubular bushing 94 is designed to be compressed from the initial state shown in FIG. 11 to the deformed state shown in FIG. 12. More specifically, upon coupling the hydraulic hose fitting 90 to the base member 16, the tubular bushing 94 is deformed by the axial force of the connecting fastener 96 that forces the tubular bushing 94 against an abutment surface of the base member 16. The tubular bushing 94 has a contoured outer surface with a pair (of annular inclined sections 94a and an annular intermediate section 94b located between the first and second annular inclined sections 94a. The tubular bushing 94 has a cylindrical inner surface 94c. Preferably, the cylindrical inner surface 94c has an inner diameter that is substantially equal to the outer diameter of the hydraulic hose 14.

The connecting fastener 96 is constructed of a hard metallic material having a hardness greater than the hardness of the tubular bushing 94 so that the connecting fastener 96 can deform the tubular bushing 94 as seen in FIG. 12. Basically, the connecting fastener 96 is a tubular member having an internal bore 96a, a hexagonal outer surface 96b and a threaded section 96c. A conical abutment surface 96d is formed at the free end of the connecting fastener 96 that has the threaded section 96c. The conical abutment surface 96d is designed to engage the tubular bushing 94 so as to deform the tubular bushing 94 radially inwardly when the connecting fastener 96 is threaded into an internal passage 16b of the base member 16. Here, the hose retaining member 98 is disposed inside the internal bore 96a of the connecting fastener 96 to aid in retaining the connecting fastener 96 on the hydraulic hose 14. Thus, the hose retaining member 98 has an internal diameter that is equal to or slightly smaller than the outer diameter of the hydraulic hose 14. In this way, the connecting fastener 96 does not slide along the hydraulic hose 14 unless moved by an external force (e.g., a person or machine) other than gravity.

Figure 13:
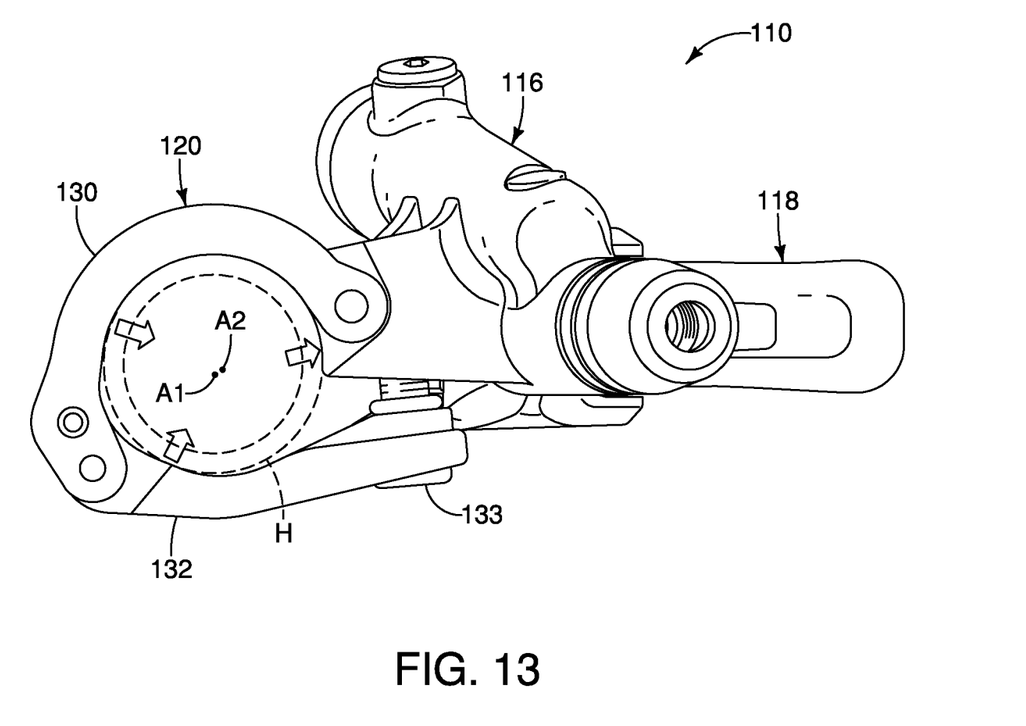
FIG. 13 is an enlarged inside end elevational view of a modified operating device in which the handlebar shown in broken lines.

Referring now to FIG. 13, a modified operating device 110 is illustrated. The operating device 110 is a left-hand operating device that is mounted on the left-hand side of the handlebar H. The operating device 110 comprises a base member 116, an operating member 118 and a handlebar fixing structure 120. The operating device 110 is identical to the operating device 10 except for the operating device 110 is a mirror image of the operating device 10 and the handlebar fixing structure 120 of the operating device 110 is inverted on the base member 116 as compared to the operating device 10. In view of the similarities between the operating devices 10 and 110, the operating device 110 will not be discussed and/or illustrated in detail. Thus, only the differences of the operating device 110 from the operating device 10 will be discussed and/or illustrated.

Here, the operating member 118 includes a left-hand operated lever. The handlebar fixing structure 120 includes a fixing portion 130, a first clamp part 131, a second clamp part 132 and a fixing fastener 133. Optionally, the handlebar fixing structure 120 further includes a ring member 134 that is provided on the fixing fastener 133. Here, the fixing fastener 130 is a right hand threaded bolt that is arranged to provide a tightening direction that rotates towards the handlebar H on a side with the support abutment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle (a small vehicle) in an upright, riding position and equipped with the hydraulic operating device. Accordingly, these directional terms, as utilized to describe the hydraulic operating device should be interpreted relative to a bicycle (a small vehicle) in an upright riding position on a horizontal surface and that is equipped with the hydraulic operating device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating device comprising:
a base member including a support abutment having a contact surface arranged to contact an outer surface of a handlebar while the operating device is in an installed state, the contact surface defining an abutment circle about an abutment axis;
an operating member movably coupled to the base member; and
a handlebar fixing structure provided on the base member, the handlebar fixing structure having a fixing surface, the fixing surface defining a fixing circle about a fixing axis offset from the abutment axis, the abutment axis being farther from the base member than the fixing axis.

2. The operating device according to claim 1, wherein the fixing circle has a fixing diameter, and
the abutment circle has an abutment diameter that is larger than the fixing circle.

3. The operating device according to claim 2, wherein a ratio of the abutment diameter with respect to the fixing diameter is in a range from 1.02 to 1.10.

4. The operating device according to claim 2, wherein the fixing diameter is in a range from 15 millimeters to 35 millimeters.

5. The operating device according to claim 1, wherein the fixing axis is offset from the abutment axis in a range from 0.5 millimeters to 1.5 millimeters.

6. The operating device according to claim 1, wherein the handlebar fixing structure further includes a fixing portion provided on the base member and has the fixing surface, a first clamp part coupled to the fixing portion, a second clamp part hingedly connected to the first clamp part, and a fixing fastener coupled to one of the fixing portion and the first clamp part so as to fasten at least the second clamp part to the fixing portion.

7. The operating device according to claim 6, wherein the first clamp part is hingedly connected to the fixing portion.

8. The operating device according to claim 6, wherein the first clamp part has a first contact point and a second clamp part has a second contact point, the first and second clamping points are arranged to apply a pushing force to the handlebar towards the fixing surface of the fixing portion.

9. The operating device according to claim 6, wherein the fixing fastener is threadedly coupled to the fixing portion.

10. The operating device according to claim 9, wherein the operating member includes a left-hand operated lever; and
the fixing fastener includes a left-hand threaded bolt.

11. The operating device according to claim 9, wherein the operating member is a left-hand operated lever; and
the fixing fastener is a right-hand threaded bolt that is arranged to provide a tightening direction that rotates towards the handlebar on a side with the support abutment.

12. The operating device according to claim 1, wherein the base member includes a cylinder housing having a cylinder bore and having a piston movably disposed in the cylinder bore, and
the operating member is operatively coupled to the piston to move the piston within the cylinder bore.

13. The operating device according to claim 12, wherein the operating member is pivotally mounted on the base member about a pivot axis, and
the cylinder bore extends along a cylinder axis that is not perpendicular to the fixing axis as viewed in a pivot axis direction of the pivot axis.

14. The operating device according to claim 12, wherein the operating member is pivotally mounted on the base member about a pivot axis, and
the cylinder bore extends along a cylinder axis that is not parallel to a handlebar axis of the fixing axis as viewed in a pivot axis direction of the pivot axis.

15. The operating device according to claim 12, wherein the operating member is pivotally mounted on the base member about a pivot axis, and
the base member includes a hydraulic reservoir tank in fluid communication with the cylinder bore, the hydraulic reservoir tank extending along a reservoir axis that is not perpendicular to the fixing axis as viewed in a pivot axis direction of the pivot axis.

16. The hydraulic operating device according to claim 12, wherein
the operating member is pivotally mounted on the base member about a pivot axis, and
the base member includes a hydraulic reservoir tank in fluid communication with the cylinder bore, the hydraulic reservoir tank extending along a reservoir axis that is not parallel to the fixing axis as viewed in a pivot axis direction of the pivot axis.

17. An operating device comprising:
a base member including a support abutment having a contact surface arranged to contact an outer surface of a handlebar while the operating device is in an installed state, the contact surface defining an abutment circle about an abutment axis, the abutment circle having an abutment diameter;
an operating member movably coupled to the base member; and
a handlebar fixing structure provided on the base member, the handlebar fixing structure having a fixing surface, the fixing surface defining a fixing circle about a fixing axis, the fixing circle having a fixing diameter,
the abutment diameter being larger than the fixing diameter and the abutment axis being farther from the base member than the fixing axis.

18. An operating device comprising:
a base member including a support abutment having a contact surface arranged to contact an outer surface of a handlebar while the operating device is in an installed state, the contact surface defining an abutment circle about an abutment axis;
an operating member movably coupled to the base member; and
a handlebar fixing structure provided on the base member, the handlebar fixing structure having a fixing surface, the fixing surface defining a fixing circle about a fixing axis offset from the abutment axis,
the handlebar fixing structure further including a fixing portion provided on the base member and having the fixing surface, a first clamp part being coupled to the fixing portion, a second clamp part hingedly connected to the first clamp part, and a fixing fastener coupled to one of the fixing portion and the first clamp part so as to fasten at least the second clamp part to the fixing portion, and
the handlebar fixing structure further including a ring member provided on the fixing fastener and arranged between the fixing portion and the second clamp part.

* * * * *